US012775949B2

(12) United States Patent
Sounderrajan

(10) Patent No.: US 12,775,949 B2
(45) Date of Patent: Oct. 27, 2026

(54) DIGITAL CODE GENERATION TO FACILITATE ONE-TIME SECURE OPERATIONS

(71) Applicant: Truist Bank, Charlotte, NC (US)

(72) Inventor: Sunitha Sounderrajan, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/680,362

(22) Filed: May 31, 2024

(65) Prior Publication Data

US 2025/0371124 A1 Dec. 4, 2025

Related U.S. Application Data

(63) Continuation of application No. 18/680,193, filed on May 31, 2024.

(51) Int. Cl.

| | |
|---|---|
| ***G06Q 20/40*** | (2012.01) |
| ***G06F 21/36*** | (2013.01) |
| ***G06Q 20/32*** | (2012.01) |
| ***G07F 19/00*** | (2006.01) |
| ***G16Y 40/35*** | (2020.01) |

(52) U.S. Cl.

CPC ......... *G06Q 20/4014* (2013.01); *G06F 21/36* (2013.01); *G06Q 20/3274* (2013.01); *G06Q 20/4015* (2020.05); *G07F 19/206* (2013.01); *G16Y 40/35* (2020.01); *G06F 2221/2129* (2013.01)

(58) Field of Classification Search

CPC ........... G06Q 20/4014; G06Q 20/3274; G06Q 20/4015

See application file for complete search history.

(56) References Cited

U.S. PATENT DOCUMENTS

2004/0122771 A1* 6/2004 Celi, Jr. ............ G06Q 20/3223 705/43

2009/0037285 A1* 2/2009 Murphy ................ G06Q 20/10 705/16

(Continued)

OTHER PUBLICATIONS

Liming Fang, et al., A Secure and Authenticated Mobile Payment Protocol Against Off-Site Attack Strategy, Aug. 4, 2021, IEEE, pp. 3564-3576 (Year: 2021).*

*Primary Examiner* — Nilesh B Khatri

(74) *Attorney, Agent, or Firm* — Nicholas Martin; Greenberg Traurig, LLP; Michael A. Springs

(57) ABSTRACT

A computer-implemented method includes receiving a request to generate a one-time operation code associated with an entity account. The one-time operation code may be used to facilitate a secure operation between a service device and a recipient of the one-time operation code using the entity account. The method may also include receiving at least one use limitation associated with the one-time operation code and generating the one-time operation code used to access the secure operation at the service device. Further, the method may include transmitting the one-time operation code to the recipient identified in the request to generate the one-time operation code. The one-time operation code may be configured to be captured by an imaging device of the service device to facilitate a one-time secure operation between the service device and the entity account.

20 Claims, 5 Drawing Sheets

(56) References Cited

U.S. PATENT DOCUMENTS

| | | | | |
|---|---|---|---|---|
| 2009/0057393 | A1* | 3/2009 | Merkow | G06Q 20/105 235/379 |
| 2009/0125446 | A1* | 5/2009 | Saunders | G06Q 20/00 235/379 |
| 2009/0194599 | A1* | 8/2009 | Gindele | G06Q 20/0457 235/494 |
| 2010/0138344 | A1* | 6/2010 | Wong | G06Q 20/385 705/35 |
| 2012/0067944 | A1* | 3/2012 | Ross | G06Q 30/0201 235/494 |
| 2012/0253852 | A1* | 10/2012 | Pourfallah | G06Q 20/327 705/41 |
| 2014/0100973 | A1* | 4/2014 | Brown | G06Q 20/322 705/17 |
| 2014/0129428 | A1* | 5/2014 | Tyler | G06Q 20/3276 705/39 |
| 2015/0088674 | A1* | 3/2015 | Flurscheim | G06Q 20/326 705/17 |
| 2015/0339664 | A1* | 11/2015 | Wong | H04L 63/0823 705/71 |
| 2017/0163617 | A1* | 6/2017 | Laxminarayanan | H04L 9/3234 |
| 2017/0236118 | A1* | 8/2017 | Laracey | G06Q 20/4014 705/44 |
| 2018/0285871 | A1* | 10/2018 | Long | G06Q 20/405 |
| 2018/0341948 | A1* | 11/2018 | Kumnick | G06Q 20/4016 |
| 2020/0279245 | A1* | 9/2020 | Venkat | G06Q 20/3274 |
| 2022/0147970 | A1* | 5/2022 | Babcock | G06Q 20/202 |
| 2022/0335408 | A1* | 10/2022 | Venkat | G06Q 20/3276 |
| 2023/0281598 | A1* | 9/2023 | Singh | G06Q 20/20 705/44 |
| 2023/0281625 | A1* | 9/2023 | Mardikar | G06Q 20/401 705/64 |

* cited by examiner

DIGITAL CODE GENERATION TO FACILITATE ONE-TIME SECURE OPERATIONS

CROSS-REFERENCE TO RELATED APPLICATION

The present application is a continuation of U.S. patent application Ser. No. 18/680,193, filed May 31, 2024, titled "DIGITAL CODE GENERATION TO FACILITATE ONE-TIME SECURE OPERATIONS", the entire of which is incorporated herein by reference.

TECHNICAL FIELD

The present disclosure relates generally to security in digital operations and, more particularly (although not necessarily exclusively), to providing digital codes to facilitate one-time, secure operations between a service device and an entity.

BACKGROUND

A service provider can resolve operation functions for entities. But some operation functions can be unavailable for certain entities attempting to perform operation functions in a secure manner. Devices operated by the service provider can require that entities provide access cards or other identification controls to authenticate an entity prior to the entity requesting that the service device perform certain service functions. The access cards or other identification controls, however, may be stolen and may not be sufficient for adequately authenticating the entity in a secure digital operation.

SUMMARY

Dynamic access to service devices can be provided to facilitate secure operations between the service devices and entity accounts. For example, a system described herein can include a processor and a non-transitory computer-readable medium including instructions that are executable by a processing device for causing the processing device to perform operations. The operations include receiving a request to generate a one-time operation code associated with an entity account. The one-time operation code is used to facilitate a secure operation between a service device and a recipient of the one-time operation code using the entity account. The operations further include receiving at least one use limitation associated with the one-time operation code and generating the one-time operation code used to access the secure operation at the service device. Further, the operations include transmitting the one-time operation code to the recipient identified in the request to generate the one-time operation code. The one-time operation code is capable of being captured by an imaging device of the service device to facilitate a one-time secure operation between the service device and the entity account.

In another example, a computer-implemented method includes receiving a request to generate a one-time operation code associated with an entity account. The one-time operation code is used to facilitate a secure operation between a service device and a recipient of the one-time operation code using the entity account. The method further includes receiving at least one use limitation associated with the one-time operation code and generating the one-time operation code used to access the secure operation at the service device.

Further, the method includes transmitting the one-time operation code to the recipient identified in the request to generate the one-time operation code. The one-time operation code is capable of being captured by an imaging device of the service device to facilitate a one-time secure operation between the service device and the entity account.

In another example, a non-transitory computer-readable medium includes instructions that are executable by a processing device for performing operations. The operations include receiving a request to generate a one-time operation code associated with an entity account. The one-time operation code is used to facilitate a secure operation between a service device and a recipient of the one-time operation code using the entity account. The operations further include receiving at least one use limitation associated with the one-time operation code and generating the one-time operation code used to access the secure operation at the service device. Further, the operations include transmitting the one-time operation code to the recipient identified in the request to generate the one-time operation code. The one-time operation code is capable of being captured by an imaging device of the service device to facilitate a one-time secure operation between the service device and the entity account.

DETAILED DESCRIPTION

Figure 1:
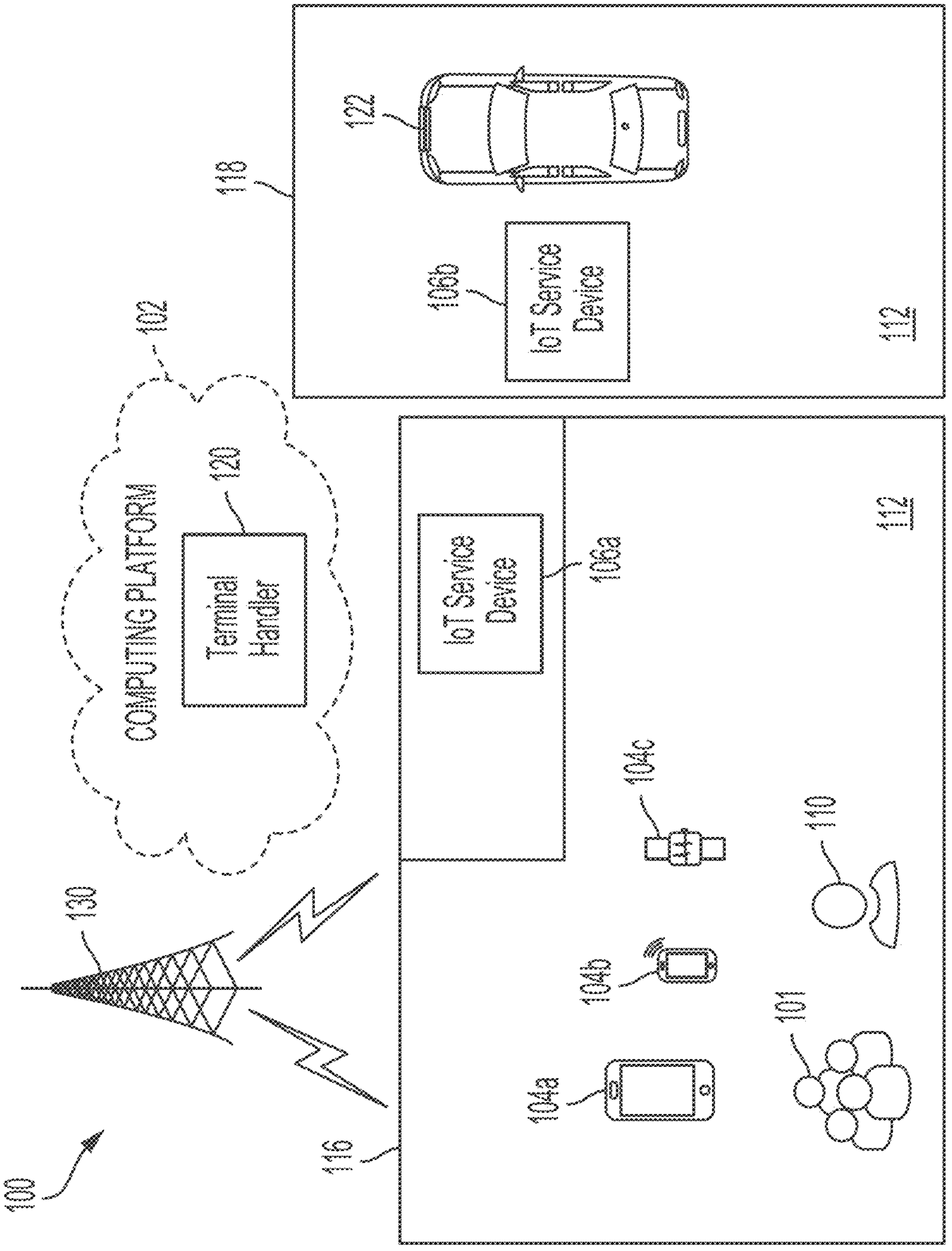
FIG. 1 is a schematic of an example of an Internet of Things (IoT) service device environment according to one example of the present disclosure.

Certain aspects and examples of the present disclosure relate to facilitating one-time, secure operations between service devices and entities. In some examples, the service devices can be Internet of Things (IoT) service devices. Examples of service devices can include registers, automated teller machines (ATMs), resource transfer terminals, check scanners, printers, personal computers, smart mobile devices, or other suitable devices associated with a service provider (e.g., a retail institution). The IoT service devices can be service devices that are connected to a network, such as a local area network (LAN) or the internet. The IoT service devices can be in communication with a computing environment (e.g., an IoT computing platform), mobile devices, other service devices, other IoT devices, etc. via the network. For example, the IoT service devices can receive requests to perform functions, receive requests for data, transmit data, or otherwise communicate with the IoT computing platform, the mobile devices, the other service devices, the other IoT devices, etc. via the network.

In an example, dynamic access to the service devices may be provided by generating one-time operation codes that include or are associated with entity controls or use limitations. The controls or use limitations may define how the one-time operation codes can be used with the IoT service devices. For example, the one-time operation codes may include controls that restrict times and locations in which the one-time operation code is valid for use in interacting with the IoT service devices. Further, the use limitation may restrict a number of uses of the one-time operation code to either an individual use, an individual use with a certain IoT service device, an individual use for a specified period of time, or a recurring series of individual operations. In additional examples, an entity may be able to activate or deactivate the one-time operation code to enable or disable global use of the one-time operation code at IoT service devices.

In some examples, the IoT service devices can be situated within a location associated with the service provider (e.g., a retail location) and the one-time operation codes can be provided to mobile devices. In particular, the one-time operation codes may be provided to mobile devices registered with entities associated with the service provider or that are running a software application associated with the service provider. In additional examples, the one-time operation codes may be printed on physical mediums (e.g., pieces of paper) and kept at locations associated with the IoT service device. For example, because of the use controls established by the entity, a one-time operation code may not be functional outside of a very specific environment (e.g., a particular location, a particular time, etc.). Accordingly, the operator of the IoT service device may only be able to initiate an operation using the one-time operation code during authorized instances even though the operator has physical control over the one-time operation code.

To provide operations by the IoT service devices using the one-time operation codes, an authentication process can be performed. The authentication process can result in the one-time operation codes providing access to an operation associated with the service provider, such as a resource transfer. In one example, the authentication process can involve a mobile device of an entity providing, via the mobile device, the one-time operation code, such as a dynamic Quick Response (QR) code, associated with an entity account and with entity defined configurations that may restrict access to the entity account through the IoT service device using the one-time operation code. The one-time operation code can function as the access request for the IoT service device, and an imaging device (e.g., a camera) of the IoT service device may scan the one-time operation code to identify the associated entity account and validate access to the entity account in a secure operation.

In response to receiving the access request, the computing environment of the IoT service device may access a database with a mapping that relates each one-time operation code to a corresponding entity account. Thus, the computing environment may identify which entity account is related to the access request based on the mapping. Further, the mapping may also relate the one-time operation code with particular limitations associated with use of the one-time operation code at the IoT service device. In some examples, the limitations may include time of access limitations, location limitations, frequency of use limitations (e.g., single use or single use within a time period), or other limitations. Thus, the computing environment may identify whether the one-time operation code is usable at a particular time at an IoT service device located in a particular location. After the computing environment identifies the IoT device and the entity account, the computing environment can provide access for the user of the mobile device to perform a secure operation at the IoT service device.

Accordingly, an entity interaction component of the IoT service device can transmit requests for the IoT service device to perform one or more functions. For example, the request can be for the IoT service device to perform an operation with respect to the entity account. In such an example, the IoT service device can be a retail register, and resource transfer functions can be performed via the retail register that can include transferring resources associated with an entity or the retailer. In this manner, the one-time operation code can initiate a request to transfer a certain amount of resources from the entity account to a secondary account. In some examples, the entity account can be a checking account belonging to the entity and the secondary account may be an account belonging to a retailer or some other additional entity.

In response to receiving the one-time operation code from the mobile device, the computing environment may cause the IoT service device to perform the function by, for example, transmitting an application programming interface (API) call to the IoT service device. In this way, the computing environment can facilitate a secure operation between the entity account and the IoT service device, in which the IoT service device transfers resources from the entity account in a secure manner. In other examples, the secure operation facilitated can include an IoT service device transmitting data to or from the entity account, withdrawing resources from the entity account, depositing resources to the entity account, etc.

Examples of the present disclosure can overcome one or more technological problems via a computing environment that can provide secure access to IoT service devices. As a result of the secure access, improved security measures can be implemented. For example, a one-time operation code on a mobile device can be read by the IoT service device. The one-time operation code can initiate an authentication process. For example, the one-time operation code can operate as authentication credentials for authenticating an operation with the IoT service device. But, if, for example, the computing environment is unable to identify an entity account based on the one-time operation code, or if the one-time operation code has been canceled by the entity that created the code or is being used beyond the entity established use limitations, the computing environment may detect a possible security breach. As a result, the computing environment may not provide access for the operation of the IoT service device. In this manner, the IoT service device may securely process or reject access to an operation, such as a secure operation at the IoT service device, using the one-time operation code.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of an IoT service device environment 100 according to one example of the present disclosure. The IoT service device environment 100 can be a location associated with a service provider. For example, the service provider can be a retail institution and the IoT service device environment 100 can be a branch location associated with the retail institution. The IoT service device environment 100 may include an indoor area 116 and an outdoor area 118. The IoT service device environment 100 may further include entity accessible areas 112. The entity accessible areas 112 can be accessed by one or more entities 101, authorized personnel 110, etc. Additionally, devices 104*a-c* and IoT service devices 106*a-b* can be located within the entity accessible areas 112.

The devices 104*a-c* can include mobile devices such as tablets 104*a*, smartphones 104*b*, smart watches 104*c*, or the like. The devices 104*a-c* can be associated with the entity 101 such as by displaying one-time operation codes registered with an entity account belonging to the entity 101. While the devices 104*a-c* are shown in proximity to the entity 101, the devices 104*a-c* are not necessarily under direct control by the entity 101. For example, the entity can use a device 104 to transfer the one-time operation code to another device 104*a-c* controlled by a different user. The devices 104*a-c* may also be associated with the authorized personnel 110, such as by being accessible via authorization credentials provided by the authorized personnel 110. The IoT service devices 106*a-b* can be devices for performing service functions. The service functions can be secure operations performed with respect to an entity account, such as a transfer of resources from the entity account. Thus, the IoT service devices 106*a-b* can include retail registers, automated teller machines (ATMs), transfer terminals, check scanners, or other suitable devices associated with a service provider (e.g., a retailer) and capable of performing service functions.

The IoT service device environment 100 may also include a computing platform 102. Examples of the computing platform 102 include a cloud computing platform or an Internet of Things (IoT) computing platform. The devices 104*a-c*, the IoT service devices 106*a-b*, and the computing platform 102 can be communicatively coupled via a network 130. The network 130 may correspond to Wide Area Networks ("WANs"), such as the Internet. In other examples, the network 130 may be a mobile telecommunication network, a short-range wireless network, or the like. The devices 104*a-c* and the IoT service devices 106*a-b* may also communicate with servers, web browsers, or entity-side applications via the network 130 to establish communication sessions, request and receive web-based resources, or access other suitable features of software applications or web services.

Additionally, in some examples, a terminal handler 120 can operate on the computing platform 102 for communicating with devices 104*a-c*, controlling IoT service devices 106*a-b*, or a combination thereof. The terminal handler 120 can manage each of the IoT service devices 106*a-b*. The terminal handler 120 can receive requests from the devices 104*a-c*. The requests can be for an IoT service device to perform functions. For example, the IoT device may be a register and a request can be for the IoT service device to transfer a certain amount of resources from an entity account to cover the purchase of an item. The terminal handler 120 may grant or deny requests based on an authentication process associated with the one-time operation code.

In an example, the one-time operation code may be a QR code, or other visual code, which is scannable by the service devices 106*a-b*. In some examples, the one-time operation code may function as a single-use code, or limited-use code, to initiate a transfer of resources from an entity account to an additional account associated with the IoT service devices 106*a-b*. For example, an entity associated with an account may generate the one-time operation code for use by another person. The one-time operation code may be associated with a specific amount of resources that are drawn from the entity's account for a specific purpose. In an example, a user of the one-time operation code may present the one-time operation code to the IoT service devices 106*a-b* during an exchange of goods or services, and the specific amount of resources associated with the one-time operation code may be debited by the cost of the goods or services. The one-time operation code use limitations may be controlled by the entity. For example, the entity may cancel the one-time operation code to prevent further use of the one-time operation code by the user, in response to the user losing the one-time operation code, or in response to a security breach associated with the one-time operation code. Further, while the one-time operation code is described with respect to FIG. 1 as being presented on the devices 104*a-c* at the IoT service devices 106*a-b*, other visual modalities, such as printing the one-time operation code on paper, may be used.

The entity that generates the one-time operation code may also provide additional controls or use limitations to the use of the one-time operation code. For example, the entity may establish a time limit for using the one-time operation code (e.g., 1-hour from receipt), a specified amount of money that can be used in an individual operation, a specified operation that can use the one-time operation code (e.g., piano lessons, specific types of groceries, etc.), specific retailers where the one-time operation code is allowed to be used, specific physical locations where the one-time operation code can be used, resource transfer limits in an operation, etc.

Additionally, the use limitations may be dynamic. For example, an entity may update the use limitations of the one-time operation code at any time while the one-time operation code is still active. Further, the entity may deactivate or reactivate the one-time operation code. Further, the one-time use code may be maintained, in some examples, with the user of the IoT service device 106 due to the customizable nature of the use limitations. For example, the one-time operation code may only be available to initiate on operation in limited circumstances, which may reduce or eliminate a risk of the one-time operation code being abused by a bad actor.

Additionally, although two IoT service devices are depicted in FIG. 1, any number of IoT service devices can be found in the IoT service device environment 100. Moreover, as illustrated in FIG. 1, a first of the IoT service devices 106*a* can be an indoor IoT service device located in the indoor area 116 and a second of the IoT service devices 106*b* can be an outdoor IoT service device located in the outdoor area 118. In some examples, the outdoor IoT service device 106*b* can be accessible to an entity within an entity vehicle 122.

Figure 2:
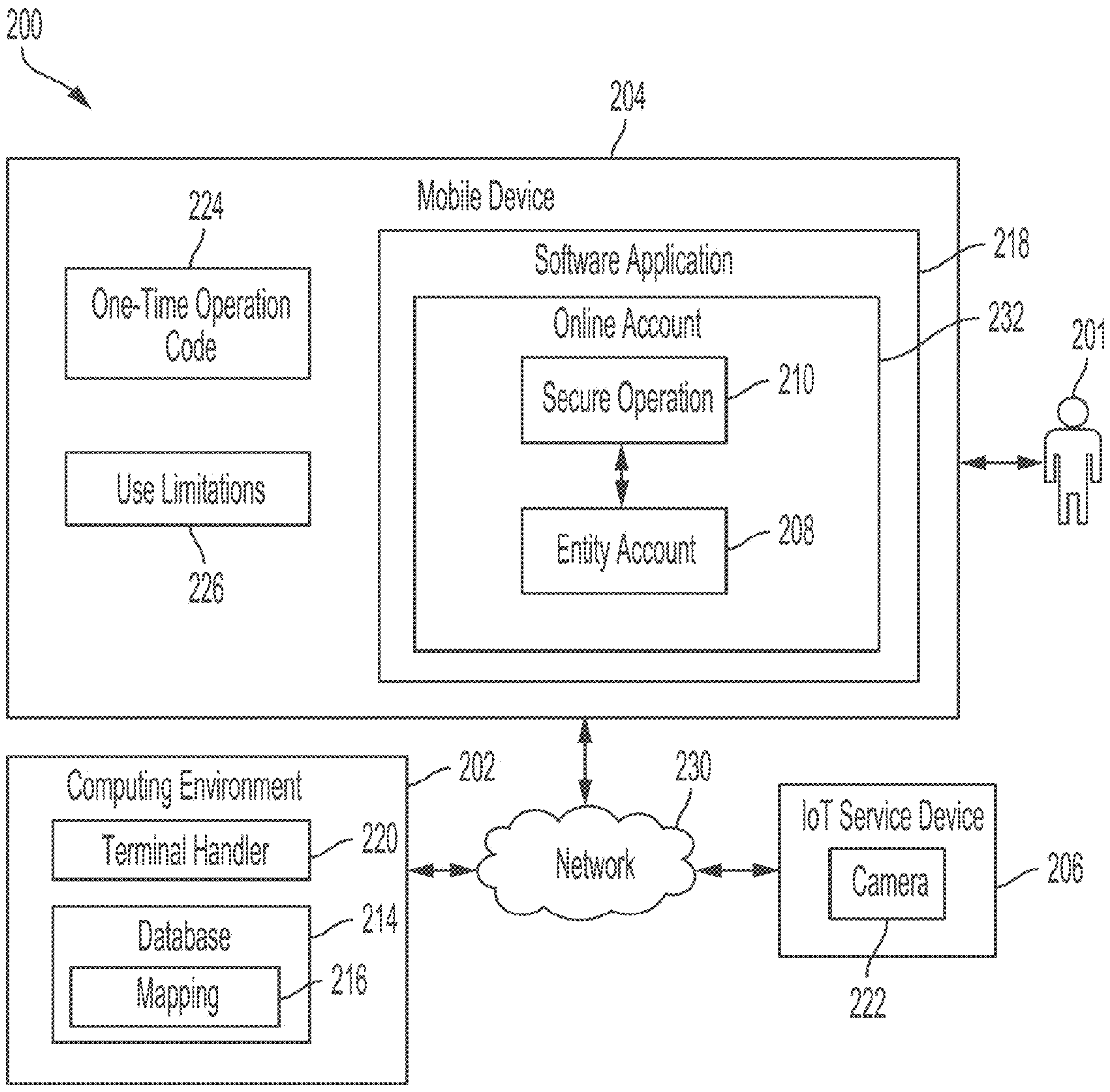
FIG. 2 is a block diagram of an example of a system for facilitating secure operations between IoT service devices and entities according to one example of the present disclosure.

FIG. 2 is a block diagram of an example of a system 200 for facilitating secure operations between IoT service devices and entities according to one example of the present disclosure. The system 200 includes a computing environment 202. In some examples, the computing environment 202 may be a distributed computing environment, such as a cloud computing system, an IoT computing platform, or a computing cluster, formed from one or more nodes (e.g., physical or virtual servers) that are in communication with one another via a network 230. Additionally, in some examples, the computing environment 202 can correspond to the computing platform 102 of FIG. 1. The computing environment 202 can be in communication with a mobile device 204 and an IoT service device 206 via the network 230. Examples of the network 230 can include a local area network (LAN) or the Internet. The computing environment 202 can be formed from a physical infrastructure that includes various network hardware, such as routers, hubs, bridges, switches, and firewalls. The physical infrastructure can also include one or more servers. The servers may provide backend support for a software application 218 (e.g., a mobile application) or may provide a web interface for enabling an entity 201 to interact with the IoT service device 206, an entity account 208, or a combination thereof.

In an example, the entity 201 may establish the entity account 208 with a service provider. The entity account 208 may be of any suitable type of account. For example, the service provider may be a bank and the entity account 208 may be a deposit account. Separately from establishing the entity account 208, the entity 201 may register for an online account 232 with the service provider for use in monitoring and performing functions related to the underlying entity account 208. The entity 201 may then link the online account to the underlying entity account 208 hosted by the service provider. The entity 201 can also register the online account 232 with the mobile device 204. Examples of the mobile device can include a mobile phone, a laptop, a tablet, or a smart watch. Other types of computing devices may also be used in place of the mobile device 204.

As a result of registering the online account 232 with the mobile device 204, the entity 201 may obtain access to the online account 232 via the software application 218 executing on mobile device 204. For example, the entity 201 may access the online account 232 via the mobile application or the web interface. In doing so, the entity 201 can generate a one-time operation code 224 for use with the IoT service device 206. The one-time operation code 224 may be a QR code associated with the entity account 208. In some examples, the user 201 can assign a monetary amount from the entity account 208 that is accessible using the one-time operation code 224. Additionally, the entity 201 may establish various controls on the use of the one-time operation code 224.

The mobile device 204 may transmit the one-time operation code 224 to other devices associated with other users, or the one-time operation code 224 may be printed onto a physical medium. Additionally, the one-time operation code 224 may be displayed on the mobile device 204 itself. The IoT service device 206 can be positioned within a location (e.g., IoT service device environment 100). The location of the IoT service device 206 may be a secure location controlled by or otherwise associated with the service provider. Additionally, the IoT service device 206 may be one of many IoT service devices within the location. For example, the IoT service device 206 may be an automated teller machine (ATM), and the location may also include one or more additional ATMs, registers, transfer terminals, check scanners, printers, or other suitable types of IoT service devices associated with the service provider. Each of the IoT service devices can include or be associated with a camera or other imaging device. For example, camera 222 can be included on or associated with IoT service device 206. Therefore, the camera 222 of the IoT service device 206 can scan the one-time operation code 224 to initiate a transfer from the entity account 208 to the service provider.

In response to receiving the one-time operation code 224 from the mobile device 204, the computing environment 202 may identify the entity account 208 associated with the entity 201 based on the one-time operation code 224. A database 214 can include a mapping 216 that relates the one-time operation codes to corresponding entities. Thus, the computing environment 202 may identify the entity account 208 by accessing the database 214 and determining, based on the mapping 216, that the entity account 208 is associated with the one-time operation code 224 even when the one-time operation code 224 is displayed on a device other than the mobile device 204.

Subsequent to identifying the entity account 208, the computing environment 202 can provide access for the IoT service device 206 to initiate a transfer of data from the entity account 208 to an account associated with the IoT service device 206. Due to the access provided to the IoT service device 206, the one-time operation code 224 can be used facilitate one or more secure operations between the IoT service device 206 and the entity account 208.

Upon initiation of the secure operation, the computing environment 202 can authenticate the one-time operation code 224. To authenticate the one-time operation code 224, the computing environment 202 may verify that the secure operation is occurring within controls 226 established by the entity 201. For example, the entity 201 may establish the controls 226 such as a number of allowed uses of the one-time operation code 224 (e.g., a single use code), a time limit for using the one-time operation code 224 (e.g., 1-hour from receipt), a time window for using the one-time operation code 224 (e.g., once per month within an hour of a triggering event), a maximum amount of resources that can be used in an individual operation, specific retailers where the one-time operation code 224 is allowed to be used, specific physical locations where the one-time operation code 224 can be used, daily use limits, specific goods or services available for use with the one-time operation code 224, etc.

After authenticating the one-time operation code 224, the computing environment 202 can transmit an application programming interface (API) call or otherwise communicate with the IoT service device 206 to cause the IoT service device to perform the secure operation, such as a withdrawal of the amount of resources from the entity account 208 associated with the one-time operation code 224.

In an example, the computing environment 202 may detect an issue with the one-time operation code 224. For example, the entity 201 may cancel the one-time operation code 224 being used by another user. Thus, the issue may include the one-time operation code 224 being invalid. Other issues with the one-time operation code may also be detected by the computing environment 202. For example, the computing environment 202 may determine that the one-time operation code 202 has already been used in another operation. In response to detecting the issue, the computing environment 202 may transmit a notification of the issue to the IoT service device 206 and may decline initiation of an operation.

Additionally, in some examples, the computing environment 202 can include a terminal handler 220 for connecting, monitoring, and maintaining the system 200. The terminal handler 220 can manage interactions between the computing environment 202, the IoT service device 206, and the mobile device 204. The terminal handler 220 may also authenticate the one-time operation code 224 using the controls 226 or transmit the API call in response to the one-time operation code 224. Additionally, the terminal handler 220 may be able to monitor the IoT service device 206. For example, the terminal handler 220 may monitor data associated with the operation of an ATM or register.

Figure 3:
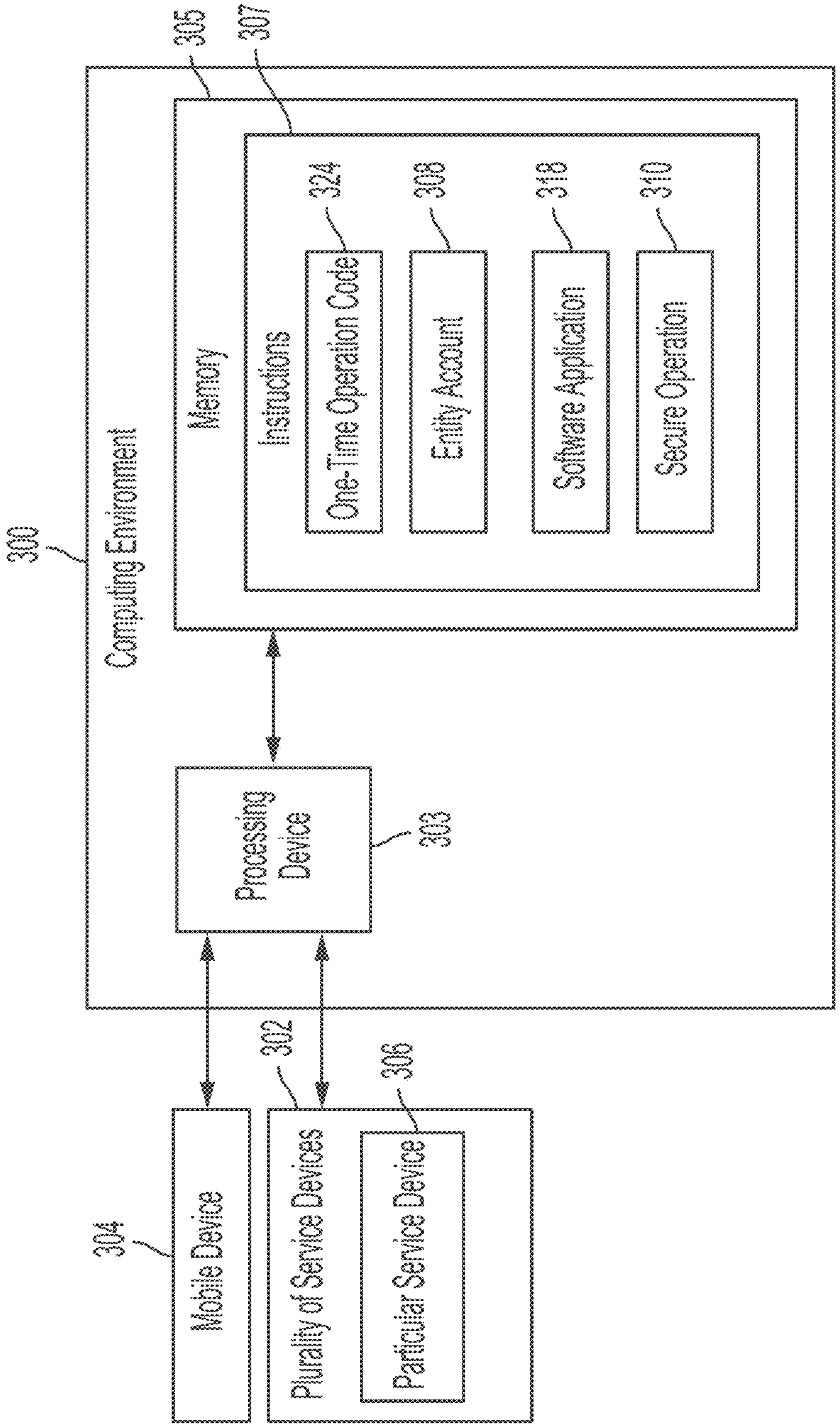
FIG. 3 is a block diagram of an example of a computing environment for facilitating secure operations between IoT service devices and entities according to one example of the present disclosure.

FIG. 3 is a block diagram of an example of a computing environment 300 for facilitating secure operations between service devices and entities according to one example of the present disclosure. The components shown in FIG. 3, such as the processing device 303, the memory 305, and the like, may be integrated into a single structure such as within the single housing of the computing environment 300. Alternatively, the components shown in FIG. 3 can be distributed from one another and in electrical communication with each other.

As shown, the computing environment 300 includes the processing device 303 communicatively coupled to the memory 305. The processing device 303 can include one processor or multiple processors. Non-limiting examples of the processing device 303 include a Field-Programmable Gate Array (FPGA), an application specific integrated circuit (ASIC), a microprocessor, or any combination of these. The processing device 303 can execute instructions 307 stored in the memory 305 to perform operations. In some examples, the instructions 307 can include processor-specific instructions generated by a compiler or an interpreter from code written in any suitable computer-programming language, such as C, C++, C#, Python, or Java.

The memory 305 can include one memory device or multiple memory devices. The memory 305 can be non-volatile and may include any type of memory device that retains stored information when powered off. Non-limiting examples of the memory 305 include electrically erasable and programmable read-only memory (EEPROM), flash memory, or any other type of non-volatile memory. At least some of the memory 305 can include a non-transitory computer-readable medium from which the processing device 303 can read instructions 307. The non-transitory computer-readable medium can include electronic, optical, magnetic, or other storage devices capable of providing the processing device 303 with the instructions 307 or other program code. Non-limiting examples of the non-transitory computer-readable medium include magnetic disk(s), memory chip(s), RAM, an ASIC, or any other medium from which a computer processor can read instructions 307.

The processing device 303 can execute the instructions 307 to perform operations. For example, the processing device 303 can receive a one-time operation code 324 from a mobile device 304. The one-time operation code 324 can be transmitted by a user of the mobile device 304 performing a secure operation 310 with a particular IoT service device 306 of a plurality IoT service devices 302. The plurality of IoT service devices 302 can be associated with a service provider. In response to receiving the one-time operation code 324, the processing device 303 can identify an entity account 308 associated with the mobile device 304 and with the service provider. Subsequent to identifying the entity account 308, the processing device 303 can provide access for the user of the mobile device 304 to perform the secure operation 310 between the particular IoT service device 306 and the entity account 308 via a software application 318 associated with the service provider.

Figure 4:
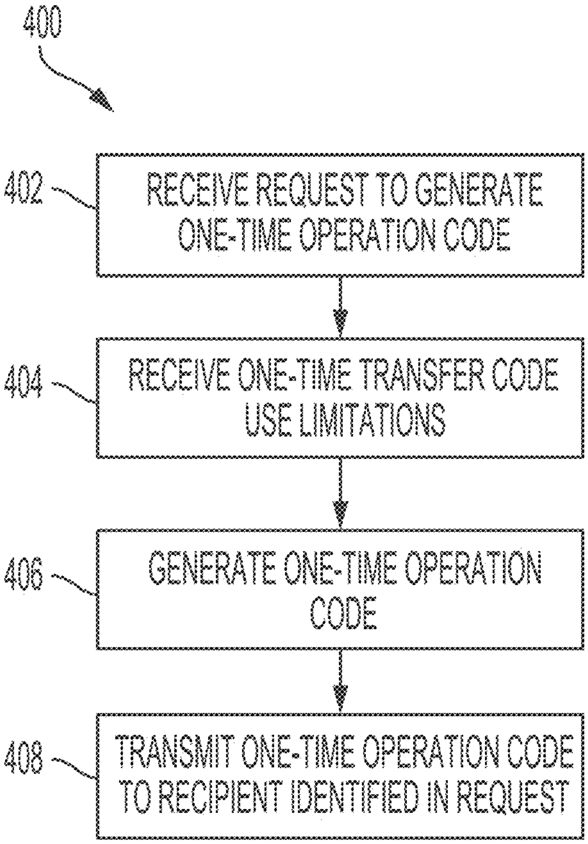
FIG. 4 is a flowchart of a process for generating a one-time operation code according to one example of the present disclosure.

FIG. 4 is a flow chart of a process 400 for generating a one-time operation code to perform secure operations with the IoT service devices according to one example of the present disclosure. The process 400 of FIG. 4 can be implemented by the terminal handler 120 of FIG. 1, the computing environment 202 of FIG. 2, or the processing device 303 of FIG. 3, but other implementations are also possible. While FIG. 4 depicts a certain sequence of blocks for illustrative purposes, other examples can involve more blocks, fewer blocks, different blocks, or a different order of the blocks depicted in FIG. 4. The blocks of FIG. 4 are described below with reference to the components of FIGS. 1-3 described above.

At block 402, the processing device 303 may receive a request to generate a one-time operation code associated with an entity account. The one-time operation code may be a dynamic QR code used to perform secure operations from the entity account with an Internet of Things (IoT) service device 306. In some examples, the one-time operation code may be generated as a single-use instruction to commence an operation at the IoT service device 306. In some examples, an entity may desire performance of a particular operation, but may not be available to perform the operation. In such an example, the entity may transfer the one-time operation code to another party that is able to perform the operation (e.g., a friend, a courier service, etc.). Such a transfer may be more secure than transferring a physical object (e.g., a debit or credit card) as a mechanism to initiate the operation. Further, security may be further enhanced do to the single-use nature of the one-time operation code.

At block 404, the processing device 303 may receive use limitations of the one-time operation code. The use limitations, which may be established by the entity along with the request to generate the one-time operation code, may control how the one-time operation code can be used at the IoT service device 306. As discussed above with respect to FIGS. 1-3, the controls may include timing controls (e.g., single use, limited use, use during particular time windows), resource transfer size controls, location controls, or any other controls that an entity may place on the use of the one-time operation code. The use limitations may provide security for the entity. For example, the entity may transfer the one-time operation code with particular limitations in place to another party. The particular limitations may prevent abuse of the one-time operation code by the receiving party by limiting the types of operations for which the one-time operation code can be used.

At block 406, the processing device 303 may generate the one-time operation code used to perform the secure operation with the IoT service device. In some examples, the one-time operation code may be encoded with information relating to the entity account and the use limitations associated with the validity of the one-time operation code provided by the entity requesting the one-time operation code. For example, the computing environment 202 may map the entity account to the one-time operation code and the identified controls in the database 214 using the mapping 216.

At block 408, the processing device 303 may transmit the one-time operation code to a recipient identified in the request to generate the one-time operation code. In an example, the recipient may receive the one-time operation code on a computing device, such as through email or through a computing application running on the computing device. In an additional example, the one-time operation code may be printed on a physical medium for collection by the recipient. Once with the recipient, the one-time operation code can be captured by an imaging device of the IoT service device 306 to initiate a secure operation between the recipient and the IoT service device 306 using the entity account.

In some examples, the processing device 303 may validate that the one-time operation code is being used by the recipient in a manner allowed by the controls established by the entity. For example, the processing device 303 may verify that the one-time operation code has not been used previously, is being used within an appropriate time window, is being used at an appropriate location, or is being used for a resource amount within limits established by the entity. Upon validating the use of the one-time operation code with the IoT service device 306, the IoT service device 306 may commence the secure operation.

Additionally, in some examples, a mobile device of the recipient of the one-time operation code may generate a secure communication connection with the IoT service device 306. In such an example, the mobile device may provide instructions relating to the secure operation to control functions of the IoT service device 306. For example, the mobile device may control how much of a secure operation should be attributable to the entity account associated with the dynamic access device and how much of the secure operation should come form an additional source.

Further, the processing device 303 may transmit instructions to the IoT service device to control functions of the IoT service device once the IoT service device receives the one-time operation code. For example, the processing device 303 can provide instructions to the IoT service device to proceed with an operation or to decline an operation based on the use limitations established by the processing device for the one-time transfer code.

Figure 5:
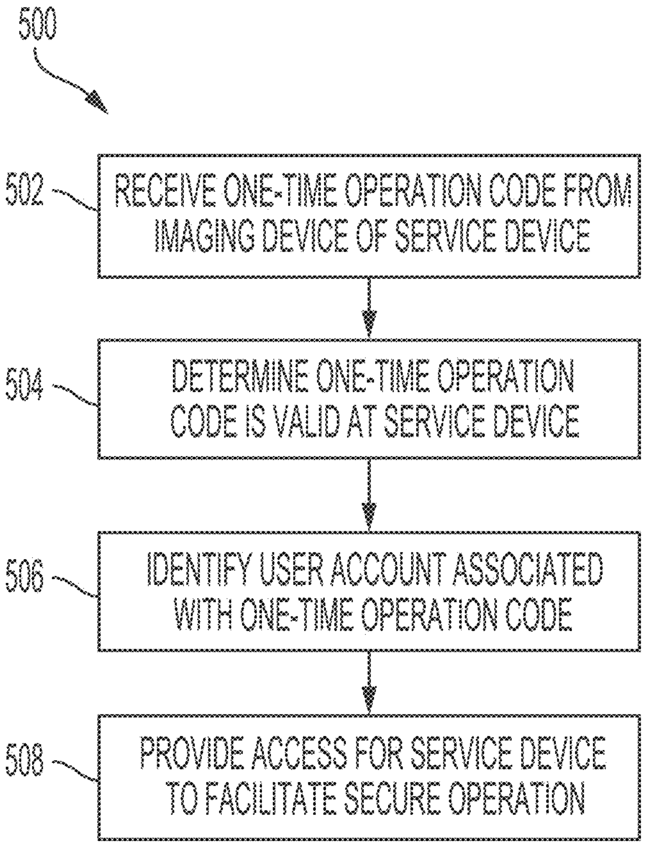
FIG. 5 is a flowchart of a process for facilitating secure operations using a one-time operation code between IoT service devices and an entity according to one example of the present disclosure.

FIG. 5 is a flow chart of a process 500 for facilitating secure operations between service devices and an entity account according to one example of the present disclosure. The process 500 of FIG. 5 can be implemented by the terminal handler 120 of FIG. 1, the computing environment 202 of FIG. 2, or the processing device 303 of FIG. 3, but other implementations are also possible. While FIG. 5 depicts a certain sequence of blocks for illustrative purposes, other examples can involve more blocks, fewer blocks, different blocks, or a different order of the blocks depicted in FIG. 5. The blocks of FIG. 5 are described below with reference to the components of FIGS. 1-3 described above.

At block 502, the processing device 303 can receive a one-time operation code 224 from an imaging device of an IoT service device 306. The one-time operation code 224 can include a visual code, such as a dynamic QR code, generated by a mobile device 304 of an entity. In some examples, the one-time operation code 224 can be generated by the processing device 303 or another computing device and transmitted to the mobile device 304 of the entity or another user. The one-time operation code may be scanned by the imaging device, such as the camera 222, of the IoT service device 306. In some examples, the one-time operation code may be generated by the mobile device 304 in response to an entity of the mobile device 304 requesting the one-time operation code, and the one-time operation code can be used by the entity, or a recipient chosen by the entity, to complete a secure operation with the IoT service device 306, where the one-time operation code establishes use limitations for the secure operation. The IoT service device 306 can be positioned in a location associated with a service provider, such as the IoT service device environment 100 depicted in FIG. 1.

At block 504, the processing device 303 can determine that the one-time operation code is valid for a secure operation at the IoT service device 306. In some examples, the one-time operation code includes a dynamic QR code. The dynamic QR code can include validation controls that are mapped by a mapping 216 in the database 214 of the computing environment 202. The dynamic QR code may be updated in a manner that establishes controls or use limitations on the use of the one-time operation code. In some examples, the dynamic QR code is associated with entity account information of the entity account. In an example, the one-time operation code may be valid for only an individual use. In an additional example, the one-time operation code may only be valid during certain windows and specified time intervals (e.g., the first of the month from 10 a.m. to 10:30 a.m.). Further, the use limitations may also include identification of a particular location and a particular time in which the QR code is valid, an indication of a resource limit for an operation, or a combination thereof. For example, validating the one-time operation code may involve determining that the IoT service device 306 is located at particular locations associated with the QR code, determining that the QR code was presented to the IoT service device 306 during a particular time associated with the QR code, and determining that the pending operation involves a resource value below a resource limit. Other controls may also be associated with the one-time operation code as described above with respect to FIGS. 1-4.

At block 506, the processing device 303 can identify an entity account associated with the one-time operation code. For example, the computing environment 202 may map the one-time operation code to the mapping 216 in the database 214 to determine the entity account associated with the one-time operation code.

At block 508, the processing device 303 can provide access for the IoT service device 306 to facilitate the secure operation. In an example, the secure operation occurs between the IoT service device and the entity account even though the user of the one-time operation code may be a user other than the entity associated with the entity account. The IoT service device 306 can be a register at a retailer or service provider, and the secure operation can include transferring resources in exchange for goods or services. Other types of IoT service devices 306, such as ATMs, electronic transfer terminals, check scanners, printers, personal computers, smart mobile devices, or other suitable devices, may also be used to facilitate secure operations using the one-time operation code.

In one example, the processing device 303 can receive a request to generate a one-time operation code associated with an entity account. The one-time operation code can be used to facilitate a secure operation between a service device and a recipient of the one-time operation code using the entity account. The processing device 303 can also receive use limitations for the one-time operation code. The use limitations may include that the one-time operation code is a single use code for an individual operation, may indicate a time in place in which the code is valid, may indicate types of goods or services available in an operation, or any combination thereof. Other use limitations may also be associated with the one-time operation code. Based on the request, the processing device 303 can generate the one-time operation code used to access the secure operation at the IoT service device. In example, the one-time operation code can be mapped to an entity account and the use limitations stored in a database of a computing environment. Upon generation of the one-time operation code, the processing device 303 can also transmit the one-time operation code to the recipient identified in the request to generate the one-time operation code. When initiating an operation, the IoT service device is able to capture the one-time operation code using an imaging device of the IoT service device to facilitate a secure operation between the IoT service device and the entity account. When the IoT service device captures the one-time operation code, the processing device 303 can determine that the one-time operation code is valid. Determining that the one-time operation code is valid may include determining that the one-time operation code was not previously used in a previous secure operation. Other use limitations may also be established for the one-time operation code, as discussed above, that may impact the validation of the one-time operation code. The processing device 303 may also identify an entity account associated with the one-time operation code from the mapping stored in the database of the computing environment. A secure operation performed based on the one-time operation code may draw from the entity account to complete the operation. For example, subsequent to validating the one-time operation code for the service device and identifying the entity account, the processing device 303 may provide access for the service device to facilitate a current secure operation between the service device and the entity account.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

an Internet of Things (IoT) service device associated with a service provider;

a computing environment, the computing environment configured to control the IoT service device by:

receiving an encoded one-time operation code from an imaging device of the IoT service device, the encoded one-time operation code transmitted in response to a mobile device displaying the encoded one-time operation code to the imaging device of the IoT service device, the encoded one-time operation code digitally transmitted in response to a digital request to perform a secure operation with the IoT service device, wherein a one-time operation code is encodable into the encoded one-time operation code by:

adjusting a database comprising a plurality of mappings, each mapping of the plurality of mappings associating a different one-time operation code of a plurality of one-time operation codes with a unique combination of user account and limitation, the adjusting comprising using the one-time operation code to identify a particular mapping of the plurality of mappings included in the database that maps an entity account with a version of a dynamic QR code of the one-time operation code, wherein the particular mapping defines (i) a one-to-one correspondence between the entity account and the version of the dynamic QR code and (ii) a limitation associated with the entity account;

selecting a particular category among a plurality of categories that comprises a time restriction and a location restriction, the particular category indicated by at least one use limitation associated with the entity account; and encoding, based on the database and the particular category, the one-time operation code into the encoded one-time operation code, wherein the encoded one-time operation code comprises (i) a first individual mapping that maps the one-time operation code to restrictions unique to the entity account and the particular category and (ii) a second individual mapping that maps the one-time operation code to the entity account;

in response to receiving the encoded one-time operation code, determining whether the encoded one-time operation code is valid, wherein determining whether the encoded one-time operation code is valid comprises (i) determining whether the encoded one-time operation code was not previously used in a previous secure operation and (ii) extracting the restrictions unique to the entity account from the encoded one-time operation code;

decoding the dynamic QR code of the encoded one-time operation code to generate decoded data of the dynamic QR code;

identifying the entity account associated with the one-time operation code based on the encoded one-time operation code;

preventing validation of the encoded one-time operation code for the IoT service device based on the entity account canceling the encoded one-time operation code; and executing code instructions based on the decoded data of the dynamic QR code, the code instructions associated with the database that prevents the secure operation between the IoT service device and the entity account from being performed.

2. The system of claim 1, wherein the encoded one-time operation code comprises a Quick-Response (QR) code generated on a mobile device and transmitted to a display device of a recipient identified in a one-time operation code request.

3. The system of claim 2, wherein determining that the encoded one-time operation code is valid for the IoT service device further comprises:

determining that the IoT service device is located at a particular location associated with the QR code; and determining that the encoded one-time operation code was received during a particular time associated with the QR code.

4. The system of claim 1, wherein the encoded one-time operation code is associated with operation code use limitations to prevent use of the encoded one-time operation code in an environment that exceeds the operation code use limitations.

5. The system of claim 4, wherein the operation code use limitations comprise particular locations and particular times in which the encoded one-time operation code is valid, and wherein the operation code use limitations further comprise a value limitation available in the secure operation.

6. The system of claim 1, wherein the IoT service device comprises a retail register or an automated teller machine.

7. The system of claim 1, wherein:

the encoded one-time operation code is configured to be delegated to a secondary user; and the computing environment is further configured to:

prior to providing access for the IoT service device to facilitate the secure operation, (i) query a remote authentication server for a current revocation status of the encoded one-time operation code and all descendant codes delegated therefrom, and (ii) permit the secure operation only if the server confirms the encoded one-time operation code and all descendant codes delegated therefrom are not revoked;

automatically invalidate all descendant codes delegated from the encoded one-time operation code when the encoded one-time operation code is revoked or expired;

validate the encoded one-time operation code by verifying that encrypted metadata embedded in the encoded one-time operation code at a time of generation matches corresponding parameters at a time of use, the encrypted metadata comprising a biometric identifier, a device integrity status, and environmental context; and record each attempted use of the encoded one-time operation code in an immutable, cryptographically signed audit log accessible to both the entity and a system operator, each attempted use having an outcome, a device identifier, and a time of attempt associated therewith.

8. The system of claim 1, wherein:

the encoded one-time operation code is generated within a trusted execution environment of a mobile device;

the encoded one-time operation code has a signature that is cryptographically signed by the trusted execution environment;

the computing environment is configured (i) to verify the signature and a device attestation prior to authorizing the secure operation and (ii) to deny the secure operation if the signature or the device attestation indicates tampering;

upon presentation of the encoded one-time operation code at the IoT service device, the computing environment is further configured (i) to transmit a confirmation request to an entity associated with the encoded one-time operation code via an independent communication channel and (ii) to permit the secure operation only upon receiving affirmative confirmation from the entity over the independent communication channel; and the computing environment is further configured to dynamically adjust use limitations associated with an unexpired encoded one-time operation code in real-time based on anomalous behavior by automatically deactivating the encoded one-time operation code or restricting a scope of the encoded one-time operation code if the anomalous behavior is detected.

9. A computer-implemented method comprising:

receiving an encoded one-time operation code from an imaging device of an Internet of Things (IoT) service device, the encoded one-time operation code transmitted in response to a mobile device displaying the encoded one-time operation code to the imaging device of the IoT service device, the encoded one-time operation code digitally transmitted in response to a digital request to perform a secure operation with the IoT service device, wherein a one-time operation code is encodable into the encoded one-time operation code by:

adjusting a database comprising a plurality of mappings, each mapping of the plurality of mappings associating a different one-time operation code of a plurality of one-time operation codes with a unique combination of user account and limitation, the adjusting comprising using the one-time operation code to identify a particular mapping of the plurality of mappings included in the database that maps an entity account with a version of a dynamic QR code of the one-time operation code, wherein the particular mapping defines (i) a one-to-one correspondence between the entity account and the version of the dynamic QR code and (ii) a limitation associated with the entity account;

selecting a particular category among a plurality of categories that comprises a time restriction and a location restriction, the particular category indicated by at least one use limitation associated with the entity account; and encoding, based on the database and the particular category, the one-time operation code into the encoded one-time operation code, wherein the encoded one-time operation code comprises (i) a first individual mapping that maps the one-time operation code to restrictions unique to the entity account and the particular category and (ii) a second individual mapping that maps the one-time operation code to the entity account;

in response to receiving the encoded one-time operation code, determining whether the encoded one-time operation code is valid, wherein determining whether the encoded one-time operation code is valid comprises (i) determining whether the encoded one-time operation code was not previously used in a previous secure operation and (ii) extracting the restrictions unique to the entity account from the encoded one-time operation code;

decoding the dynamic QR code of the encoded one-time operation code to generate decoded data of the dynamic QR code;

identifying the entity account associated with the one-time operation code based on the encoded one-time operation code;

preventing validation of the encoded one-time operation code for the IoT service device based on the entity account canceling the encoded one-time operation code; and executing code instructions based on the decoded data of the dynamic QR code, the code instructions associated with the database that prevents the secure operation between the IoT service device and the entity account from being performed.

10. The computer-implemented method of claim 9, wherein the encoded one-time operation code comprises a Quick-Response (QR) code generated on a mobile device and transmitted to a display device of a recipient identified in a one-time operation code request.

11. The computer-implemented method of claim 10, wherein determining that the encoded one-time operation code is valid for the IoT service device further comprises:

determining that the IoT service device is located at a particular location associated with the QR code; and determining that the encoded one-time operation code was received during a particular time associated with the QR code.

12. The computer-implemented method of claim 9, wherein the encoded one-time operation code is associated with operation code use limitations to prevent use of the encoded one-time operation code in an environment that exceeds the operation code use limitations.

13. The computer-implemented method of claim 12, wherein the operation code use limitations comprise particular locations and particular times in which the encoded one-time operation code is valid, and wherein the operation code use limitations further comprise a value limitation available in the secure operation.

14. The computer-implemented method of claim 9, wherein the IoT service device comprises a retail register or an automated teller machine.

15. A non-transitory computer-readable medium comprising instructions that are executable by a processing device for causing the processing device to perform operations comprising:

receiving an encoded one-time operation code from an imaging device of an Internet of Things (IoT) service device, the encoded one-time operation code transmitted in response to a mobile device displaying the encoded one-time operation code to the imaging device of the IoT service device, the encoded one-time operation code digitally transmitted in response to a digital request to perform a secure operation with the IoT service device, wherein a one-time operation code is encodable into the encoded one-time operation code by:

adjusting a database comprising a plurality of mappings, each mapping of the plurality of mappings associating a different one-time operation code of a plurality of one-time operation codes with a unique combination of user account and limitation, the adjusting comprising using the one-time operation code to identify a particular mapping of the plurality of mappings included in the database that maps an entity account with a version of a dynamic QR code of the one-time operation code, wherein the particular mapping defines (i) a one-to-one correspondence between the entity account and the version of the dynamic QR code and (ii) a limitation associated with the entity account;

selecting a particular category among a plurality of categories that comprises a time restriction and a location restriction, the particular category indicated by at least one use limitation associated with the entity account; and encoding, based on the database and the particular category, the one-time operation code into the encoded one-time operation code, wherein the encoded one-time operation code comprises (i) a first individual mapping that maps the one-time operation code to restrictions unique to the entity account and the particular category and (ii) a second individual mapping that maps the one-time operation code to the entity account;

in response to receiving the encoded one-time operation code, determining whether the encoded one-time operation code is valid, wherein determining whether the encoded one-time operation code is valid comprises (i) determining whether the encoded one-time operation code was not previously used in a previous secure operation and (ii) extracting the restrictions unique to the entity account from the encoded one-time operation code;

decoding the dynamic QR code of the encoded one-time operation code to generate decoded data of the dynamic QR code;

identifying the entity account associated with the one-time operation code based on the encoded one-time operation code;

preventing validation of the encoded one-time operation code for the IoT service device based on the entity account canceling the encoded one-time operation code; and executing code instructions based on the decoded data of the dynamic QR code, the code instructions associated with the database that prevents the secure operation between the IoT service device and the entity account from being performed.

16. The non-transitory computer-readable medium of claim 15, wherein the encoded one-time operation code comprises a Quick-Response (QR) code generated on a mobile device and transmitted to a display device of a recipient identified in a one-time operation code request.

17. The non-transitory computer-readable medium of claim 16, wherein determining that the encoded one-time operation code is valid for the IoT service device further comprises:

determining that the IoT service device is located at a particular location associated with the QR code; and determining that the encoded one-time operation code was received during a particular time associated with the QR code.

18. The non-transitory computer-readable medium of claim 15, wherein the encoded one-time operation code is associated with operation code use limitations to prevent use of the encoded one-time operation code in an environment that exceeds the operation code use limitations.

19. The non-transitory computer-readable medium of claim 18, wherein the operation code use limitations comprise particular locations and particular times in which the encoded one-time operation code is valid.

20. The non-transitory computer-readable medium of claim 19, wherein the operation code use limitations further comprise a value limitation available in the secure operation.

* * * * *